Sept. 21, 1948.   W. D. ELLIS, 3D   2,449,595
REINFORCED PLASTIC MATERIAL
Filed Aug. 19, 1944   2 Sheets-Sheet 1

Inventor
William D. Ellis, III.

By Semmes Keegin Beale & Semmes
Attorneys

Sept. 21, 1948.　　　W. D. ELLIS, 3D　　　2,449,595
REINFORCED PLASTIC MATERIAL

Filed Aug. 19, 1944　　　2 Sheets—Sheet 2

Inventor
William D. Ellis, III.

By Semmes, Keegin, Beale & Semmes
Attorneys

Patented Sept. 21, 1948

2,449,595

UNITED STATES PATENT OFFICE 2,449,595

REINFORCED PLASTIC MATERIAL

William D. Ellis, III, Atlanta, Ga.

Application August 19, 1944, Serial No. 550,281

7 Claims. (Cl. 154—43)

The present invention relates to the manufacture of reinforced plastics and plastic laminates, and more especially to a plastic in which the reinforcement is a mat formed of warp strands, of loosely interengaged fibers, disposed in parallel relation and brought together by filling threads which interlace the warp strands.

Hitherto, a variety of materials have been used in the production of reinforced plastics, including woven cloth made from yarn. This combination of plastic and woven fabric produces a complementary effect whereby many of the weaknesses of one are greatly strengthened by the other material. However woven cloth made from yarn has a number of characteristics which are unsuitable for this purpose, including a tendency to gather into folds when formed into a cupped or similar curved shape due to its inability to stretch except in a direction diagonal to the weave. Fabrics, such as heavy duck, also absorb a plastic solution slowly and therefore cannot be readily impregnated. Moreover, the plastic component of these woven materials must carry the load until the crimp has been pulled out straight.

One of the objects of the present invention is to overcome these disadvantages of the prior art.

Another object of this invention is to provide a mat in which the warp strands are of relatively large diameter and composed of loosely interengaged fibers.

Still another object of this invention is to provide a reinforcing web for a plastic in which the greatest tensile strength lies longitudinally of the mat thereby permitting treatment with the plastic without distortion of the reinforcing web.

Another object of this invention is to provide a reinforced plastic which may be readily formed into any desired shape before the plastic hardens.

Still another object of this invention is to provide a plastic of interbonded layers which are readily compressible to form a laminated plastic of high tensile and compression strength per unit thickness.

Yet another object of this invention is to provide a laminated plastic which can be manufactured economically because fewer interbonded layers of reinforcing web are required per unit weight of material desired.

Still another object of this invention is to provide a reinforced plastic in which the reinforcing web is a mat of warp strands of loosely interengaged fibers, disposed in parallel relation, and bound together by filling threads which interlace the warp strands.

A further object of this invention is to provide a laminated plastic of interbonded layers, each layer of which is formed of a mat of warp strands of loosely interengaged fibers, disposed in parallel relation, and bound together by filling threads which interlace the warp strands.

With these and other objects in view which will appear more fully hereinafter, the present invention embraces broadly the concept of providing a mat comprising warp strands of relatively large diameter, composed of loosely interengaged fibers, interlaced by filling threads which hold the strands together and the employment of this mat as a web in the manufacture of reinforced plastics and laminated products. The term "strands of loosely interengaged fibers" is intended to include both slivers and rovings. These strands are preferably made of cotton but other material of mineral, vegetable and animal origin, such as hemp, silk, asbestos, wool, and including synthetic products such as nylon and rayon, may be used.

Any suitable plastic, either thermo-setting or thermo-plastic, may be employed for impregnating the web, including both synthetic and natural plastics, such as dispersions of nitrocellulose or other adhesive cellulosic derivatives, vinyl type poylmers and co-polymers, fatty acid modified alkyds, the phenolics and ureas and shellac.

The mat may be impregnated with the selected plastic in any suitable manner such as by dipping into a solution of the plastic. When a thermosetting plastic is employed, the impregnated mat is then preferably run through squeeze rolls and led into a drier where the solvent is removed and the plastic converted from the "A," or soluble and fusible stage, to the "B," or partially insoluble stage.

In the "B" stage it is ready to be shaped into commercial products such as flat or curved sheets of various thicknesses. Alternately it may be interbonded to form laminated products. The plastic is then converted into the "C," or insoluble stage.

The use of the strands of fibers as the warp provides a high tensile strength longitudinally of the mat. This is an important feature as it insures that the web will not be distorted while being drawn through the dip tank and squeeze rolls.

The accompanying drawings illustrate a practical application of the invention.

Figure 1:
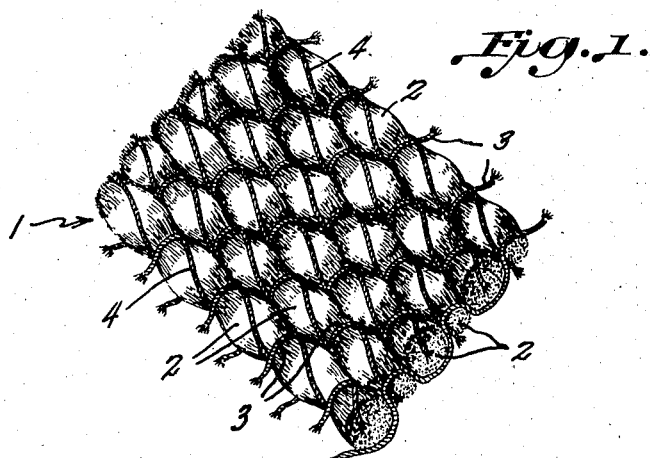
Figure 1 is an enlarged, fragmental, perspective view of a matting constructed in the manner contemplated in the present invention.

As shown in the drawings, the preferred reinforcing web which forms the subject matter of the present invention in the form of a mat, generally indicated by the numeral 1, which comprises an assembly of parallel strands of sliver 2, which are preferably composed of cotton fibers. As has been previously set forth, however, the strands may be made of rovings, and fibers other than cotton of either natural or synthetic origin may be employed if desired. Moreover, the term "fibers" is intended to include filaments, especially continuous filaments of synthetic origin.

The strands 2 form the warp of the material and are woven together by an interlacing filling thread 3 which extends transversely of the strands. The threads 3 may be of cotton or any suitable type of yarn. If desired, the fibers of each individual strand 2 may be held intact by one or more helically extending threads 4.

Figure 2:
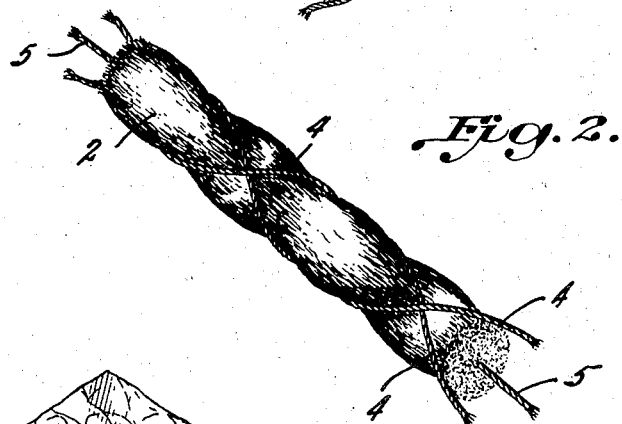
Figure 2 is a fragmental, perspective view illustrating one form of sliver which can be employed in making the mat.
Figures 4, 5:
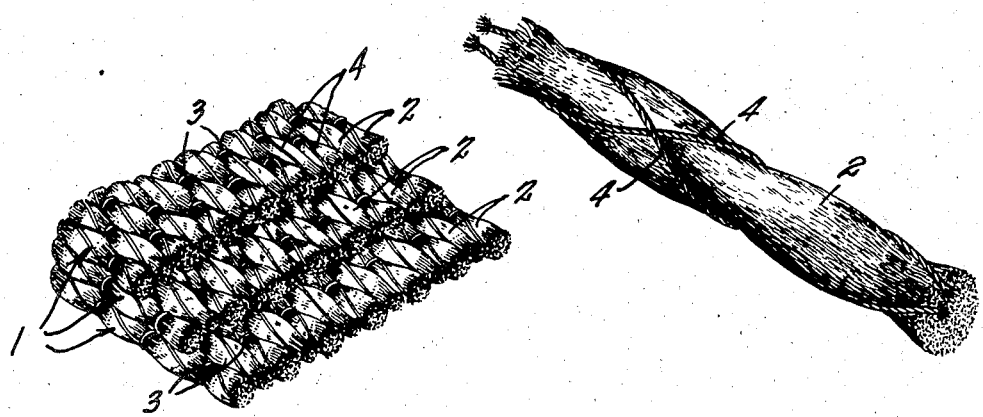
Figure 4 is a fragmental, perspective view of a plurality of plastic treated mats, which have been superimposed preparatory to pressing to form interbonded layers.
Figure 5 is a fragmental, perspective view illustrating a second form of sliver which can be employed in making the mat.

In the form shown in Figure 2, the fibers of each strand 2 are disposed about a centrally positioned thread 5. This construction increases the tensile strength of the strands, and together with the use of the strands 2 to form the warp of the mat provides a material the greatest tensile strength of which lies longitudinally of the mat. However, a mat made from strands from which the thread 5 has been omitted (such as shown in Figure 5) has sufficient tensile strength for the purposes to be described.

In making the mat shown in the drawings, a plurality of strands of the sliver 2 are assembled in parallel relation. These strands may consist of a continuous length of sliver which is extended back and forth in zig-zag formation, or a plurality of individual strands of sliver may be utilized as shown in Figure 1. The slivers are then bound together by weaving the thread 3 between the individual strands.

It has been found that a mat of this construction will permit a certain amount of elongation and contraction of the material. It is therefore especially adaptable for the purposes which will be subsequently described. In weaving the strands of sliver 2 together, the tightness of the filling thread 3 will, of course, serve to modify the compactness of the composite mat formed. The desired degree of compactness will depend upon the use for which the material is intended but will not affect the tensile strength which lies longitudinally with respect to the mat. A mat, the warp strands of which are rovings, can be prepared in a similar manner.

In a commercial application of this invention the selected plastic, which may be one of the Bakelite urea laminating varnishes, is applied in any suitable manner such as by dipping the mat into the plastic in the manner which has previously been described. The mat is then passed through squeeze rollers to remove the excess solvent and transported to a vertical or horizontal drier where the plastic is converted into the "B" or partially insoluble stage. It may then be wound up and used from the roll to make the desired finished product during which operation the plastic is converted into the "C" or insoluble stage. These operations may be accomplished without distortion of the mat because of the use of the strands to form the warp of the material.

This reinforced plastic is suitable for a great variety of uses and may be made before "setting" into flat or curved sheets or formed into various products. It is especially desirable for forming into rounded articles because the weave permits the material to be formed by pressure molding into a cupped shape without bunching.

In forming the material into flat sheets, the mat is unwound and cut into portions of the desired dimensions. Heat is then applied to convert the plastic into the previously mentioned "C" stage. Ordinarily pressure is also applied, the degree varying over a wide range. However, processes have been developed in which pressure is not utilized.

Pressure is usually exerted by placing the cut pieces of material between flat or curved plates. A shiny surface can be obtained by the use of polished plates, and alternately, grained, brushed, or sand blasted plates may be used if this finish is called for. Flat sheets are used extensively for decorative purposes and suitable plastics are available which permit a wide selection of translucent and opaque colors. Single thicknesses of this material have an excellent modulus of elasticity. The sheets may be veneered with paper or plywood.

Layers of this reinforced plastic may also be interbonded to form a laminated material. The mat construction of this invention is especially suitable for use in the making of laminated products because it can be compressed to a degree which affords an appreciable strength per unit thickness. This is occasioned by the high compressibility of the individual strands of fibers which form the mat. These laminates can also be economically produced because of the relatively lower initial cost of the mats, and the fact that less handling is necessary due to the relatively few layers required per unit weight.

Samples of these laminates containing ten plies of this material have shown a compression test which would render them suitable for use as compressed brake blocks in the railroad industry. These samples also disclosed a high tensile strength, especially when the strands of sliver forming successive layers were all disposed in parallel relation.

Figure 3:
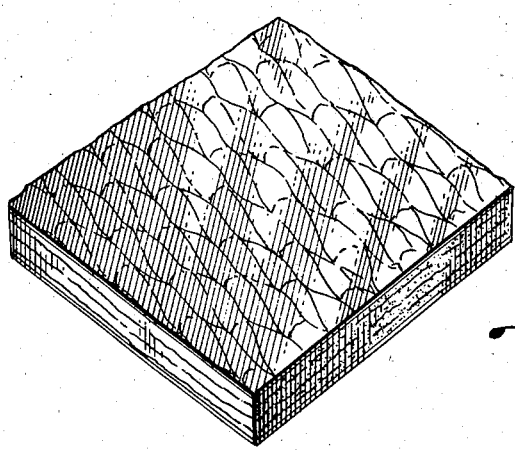
Figure 3 is a fragmental view of the laminated plastic of interbounded layers formed by the application of pressure.

In forming these laminates, the reinforced plastic in the "B" stage is unwound and cut into sheets of the desired size. A plurality of these sheets are superimposed one upon the other as, for example, in the manner shown in Figure 4 and are then interbonded, in a laminating press, at a raised temperature to form a solid homogeneous mass such as shown in Figure 3. The temperatures employed will vary with the type of plastic selected and the amount of pressure will depend upon the characteristics of the laminated product which are desired. Temperatures up to 300° F. and pressures up to 1500 lbs. per square inch are common for this purpose but the invention is not limited to any specific process.

Figure 6:
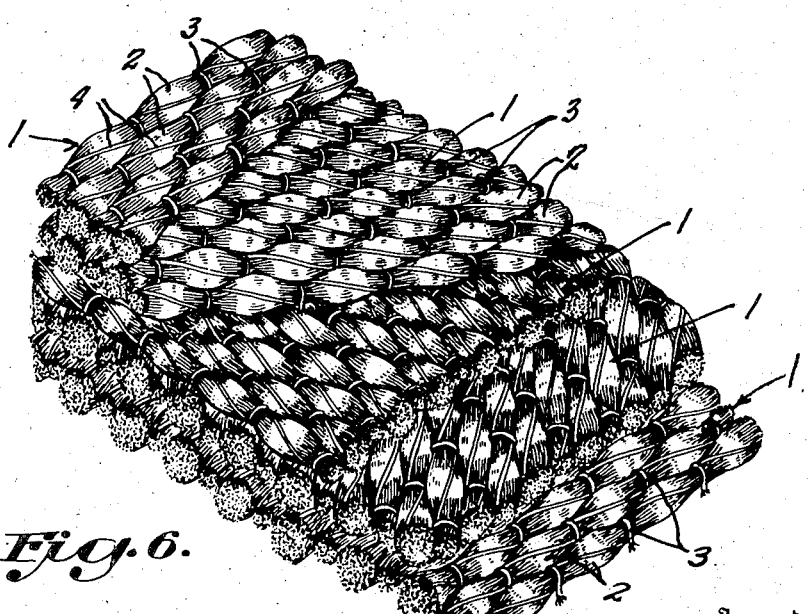
Figure 6 is a view similar to Figure 4 but illustrating a modified arrangement of the layers.

The disposition of the mats shown in Figure 4 provides, as has previously been indicated, great tensile strength in the direction in which the sliver extends. However, it has been found desirable, where equal tensile strength in all directions is required, to dispose the mats in such a manner that the strands of sliver of successive layers extend transversely with respect to each other. Preferably, where a number of layers are employed, the mats are staggered so that the strands of sliver of adjacent mats intersect each other at angle of less than 90° as is shown in Figure 6.

These laminated products have a great variety of uses including the manufacture of such articles as table tops and wall paneling which require flat surfaces. These sheets may also be economically machined into gears, bushings, pinions, cams, and other mechanical parts.

A variety of products, such as tubes, rods, straps, valve balls, sheave pulleys, and the like, may be made by molding or rolling. In forming these objects, the mat is unwound and molded to the desired shape before heat is applied to change the plastic into the "C" stage. The amount of pressure employed varies over a wide range.

In producing tubes the mat is rolled on a mandrel having the correct outside diameter and the tube is pressed between the two heads of a split mold. Rods are obtained by withdrawing the mandrel before pressing. In rolling processes the pressure is supplied by a roller, and the rolled tube is subsequently placed in an oven and baked for several hours. Each of these processes have certain advantages for different applications.

In forming rounded articles such as helmets, valve balls, sheave pulleys, and the like, the sheets to form the laminated product by-pass the laminating press and are placed in a molding press employing dies and punchers where they are shaped to form the desired article and heated to convert the plastic into the "C" stage. As previously set forth, mats made in accordance with the present invention are especially suitable for use in such processes because the flexibility of the material permits it to be readily shaped without bunching.

While for purposes of illustration a single mat construction and only a general process for making the reinforced plastic has been shown, it is obvious that various changes may be made by one skilled in the art without departing from the spirit of the invention. For example, a manner of interweaving the filling thread, other than that shown, may be employed. Moreover, the process for obtaining the reinforced plastic may be varied and new types of plastic used without departing from the spirit of the invention.

I claim:

1. A reinforced plastic product including a plurality of strands composed of loosely interengaged untwisted long fibers capable of thorough impregnation by a liquid binder, said strands being disposed in a parallel adjacent relationship, threads enclosing each strand at intervals along its length to contain and compress the fibers thereof, filling threads interlacing the wrapped loose fiber strands to secure the strands as a mat, and a binder binding the fibers and the composite fiber strands together as an integral whole.

2. A reinforced plastic comprising warp strands of relatively large diameter composed of relatively long, loosely interengaged untwisted fibers, said strands being disposed in parallel relation, helically extending threads wrapped about the strands binding the fibers of each strand together, filling threads interlacing the strands and a hardened plastic which binds the web elements together.

3. A reinforced plastic comprising warp strands of relatively large diameter composed of relatively long, loosely interengaged untwisted fibers, said strands being disposed in parallel relation and the fibers of each strand being disposed about a centrally positioned thread, helically extending threads wrapped about the strands binding the fibers of each strand together, filling threads interlacing the warp strands and a hardened plastic which binds the web elements together.

4. A reinforced plastic comprising warp strands of relatively large diameter composed of relatively long, loosely interengaged untwisted cotton fibers, said strands being disposed in parallel relation, helically extending threads wrapped about the strands binding the fibers of each strand together, filling threads interlacing the warp strands and a hardened plastic which binds the web elements together.

5. A reinforced plastic comprising warp slivers of a fibrous material disposed in parallel relation, the fibers of each sliver being relatively long and disposed about a centrally positioned thread, helically extending threads wrapped about the slivers binding the fibers of each sliver together, filling threads interlacing the warp slivers and a hardened plastic which binds the web elements together.

6. A laminated plastic of interbonded layers, each layer comprising a mat of warp strands of relatively large diameter composed of relatively long, loosely interengaged untwisted fibers, said strands being disposed in parallel relation, helically extending threads wrapped about the strands binding the fibers of each strand together filling threads interlacing the warp strands, the strands of each layer extending in parallel relation with respect to the strands of the remaining layers and a hardened plastic which binds the web elements and layers together.

7. A laminated plastic of interbonded layers, each layer comprising a mat of warp strands of relatively large diameter composed of relatively long, loosely interengaged untwisted fibers, said strands being disposed in parallel relation, helically extending threads wrapped about the strands binding the fibers of each strand together filling threads interlacing the warp strands, the strands of each layer extending in transverse relation to the strands of adjacent layers and a hardened plastic which binds the web elements and layers together.

WILLIAM D. ELLIS, III.

REFERENCES CITED

The following references are of record in the file of this patent:

UNITED STATES PATENTS

| Number | Name | Date |
|---|---|---|
| 1,567,574 | Clay | Dec. 29, 1925 |
| 1,601,911 | Godfrey | Oct. 5, 1926 |
| 1,942,546 | Gillies | Jan. 9, 1934 |
| 2,087,303 | Rosch et al. | July 20, 1937 |
| 2,311,356 | Astley | Feb. 16, 1943 |

FOREIGN PATENTS

| Number | Country | Date |
|---|---|---|
| 502,409 | Great Britain | Mar. 13, 1939 |